United States Patent [19]
Khatchadourian et al.

[11] Patent Number: 6,056,265
[45] Date of Patent: May 2, 2000

[54] VALVE MOUNTING DEVICE

[75] Inventors: Varouj Khatchadourian, Montreal; Trevor Eason, Winnipeg, both of Canada

[73] Assignee: Consolequip Inc., Winnipeg

[21] Appl. No.: 09/177,608

[22] Filed: Oct. 23, 1998

[51] Int. Cl.[7] .................................................. F16L 29/00
[52] U.S. Cl. ........................................ 251/149.1; 251/143
[58] Field of Search ............................. 251/149.1, 149.6, 251/148, 143, 149

[56] References Cited

U.S. PATENT DOCUMENTS 4,114,565  9/1978  Dodé et al. .................. 251/149.1 X
5,197,511  3/1993  Kohn et al. ................... 251/149.6 X

*Primary Examiner*—Kevin Lee
*Attorney, Agent, or Firm*—Murray E. Thrift; Adrian D. Battison; Michael R. Williams

[57] ABSTRACT

A test flange is used for an air brake piping system for railroad cars. The flange fits between an end flange of the brake cylinder pipe and the housing of the valve to which it is normally connected. The test flange includes a through aperture that aligns with the pipe end and the port in the valve housing and a test port that carries a quick disconnect valve in a lug with a distinct offset from the symmetrical centre line of the test flange. An internal passage in the test flange leads from the aperture to the test port.

11 Claims, 1 Drawing Sheet

VALVE MOUNTING DEVICE

FIELD OF THE INVENTION

The present invention relates a test flange for use in piping systems, particularly railway car braking systems.

BACKGROUND

Recently, North American railroad companies have been required to install quick disconnect valves on all freight cars to allow the testing of air brake pipe pressures. The present invention relates to an apparatus for mounting such a valve in existing and new pipe systems.

SUMMARY

According to the present invention there is provided a test flange for a piping system including at least one pipe and an end flange mounted on the pipe for connecting the pipe to another object, the test flange comprising:

a plate engagable over the end flange to be captured between the end flange and the object with at least one portion of the plate extending beyond a peripheral edge of the end flange;

an aperture through the plate for alignment with the pipe;

a test port formed in the at least one portion of the plate for connection to a valve; and a passage in the plate between the aperture and the test port.

The test flange mounts between the end flange of an air pipe and the structure to which the end flange is normally connected, for example a brake valve housing. The test flange may incorporate a gasket and groove similar to those incorporated in the end flange A quick disconnect valve is fitted to the test port to allow monitoring of the pipe pressure.

The currently preferred design of the test flange plate is an elongate shape with lobes at diametrically opposite sides for bolt holes, matching the overall shape and size of the pipe end flange. A lug extends from a side of one of the fastener lobes.

The plate may be fabricated from any suitable material. Examples are metal, powdered metal and plastics.

BRIEF DESCRIPTION OF THE DRAWINGS

In the accompanying drawings, which illustrate an exemplary embodiment of the present invention.

DETAILED DESCRIPTION

Figure 1:
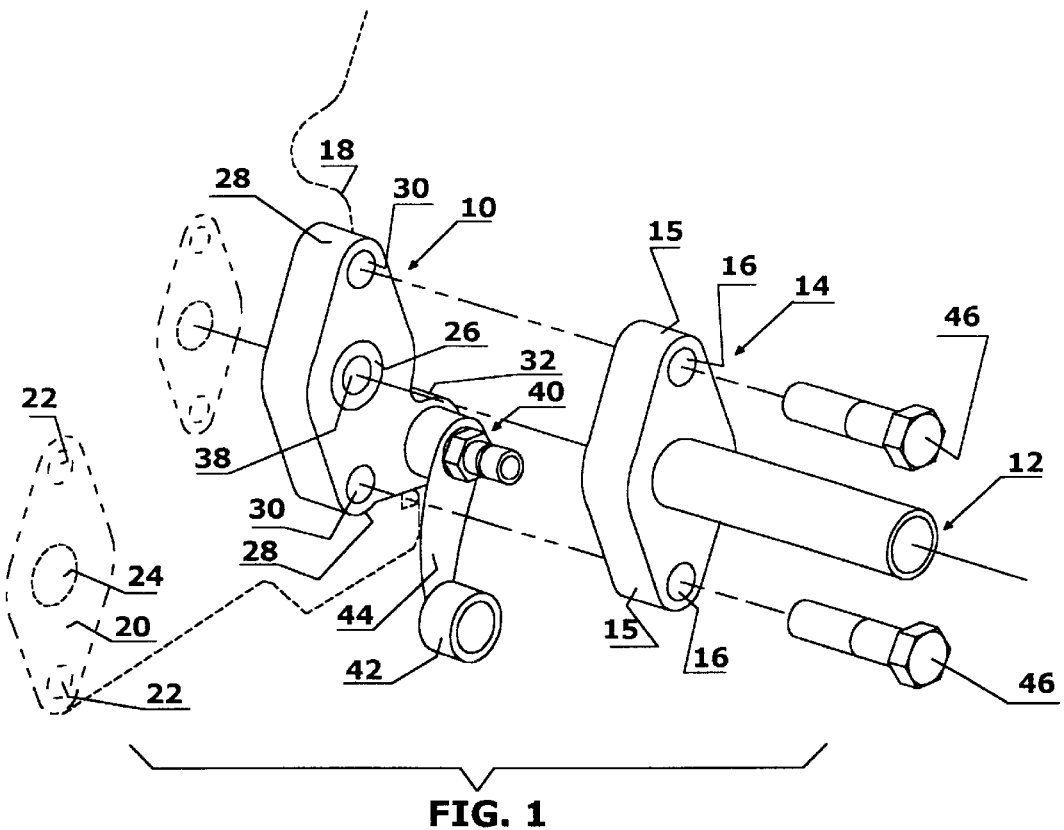
FIG. 1 is an isometric, exploded view of a system incorporating the present invention.
Figure 2:
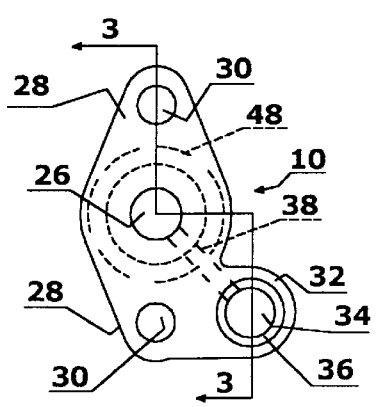
FIG. 2 is an elevation of the test flange.
Figure 3:
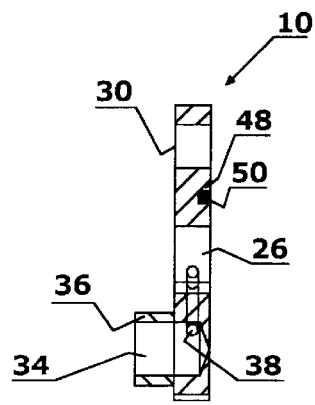
FIG. 3 is a cross-section along line 3—3 of FIG. 2.

Referring to the accompanying drawings, there is illustrated a test flange 10 that is used with a brake pipe 12 with an end flange 14. The end flange has an elongate shape with diametrically opposed lobes 15 to accommodate fastener holes 16.

In normal use, the end flange 14 is used to connect the brake pipe 12 to a brake valve housing 18. The housing has a coupling face 20 matching the end flange 14 in shape and size. It has two threaded bores 22 that align with the fastener holes 16 in the end flange and an air passage 24 that aligns with the end of the pipe.

The test flange 10 is a plate that is positioned between the face 20 on the valve housing and the end flange 14. It has an aperture 26 that aligns with the end of the pipe and the air passage 24. The plate has an elongate shape with two lobes 28 matching the lobes 15 of the end flange. Two fastener holes 30 through the lobes 28 align with the fastener holes 16 in the end flange 14. A lug 32 projects to one side of the one of the lobes 28 and a test port 34 is formed in the lug 32. The test port includes a collar 36 that projects from one face of the test flange. An internal passage 38 in the test flange leads from the test port 34 to the aperture 26. A quick disconnect valve 40 is screwed into the collar 36. This is a conventional quick disconnect valve that is normally closed and opens in response to engagement with a mating coupling.

A dust cap 42 fits over the quick disconnect valve 40. It is held against loss by a flexible tether 44 captured between the quick disconnect valve and the end of collar 36.

In use, the test flange 10 is sandwiched between the end flange 14 and the mounting face 20 of the valve housing. The assembly is held together using two bolts 46 through the holes 16 in the end flange and 30 in the test flange and into the fastener bores 22 in the valve housing. To limit leaks, the test flange is provided with an annular groove 48 on that face facing the brake valve housing and an annular gasket 50 seated in the groove. The annular groove 48 and gasket 50 are identical to those found on the end flange 14.

The test flange is very simple to install and to maintain. It needs no modification to existing piping systems.

While one embodiment of the present invention has been described in the foregoing, it is to be understood that other embodiments are possible within the scope of the invention. The invention is to be considered limited solely by the scope of the appended claims.

We claim:

1. In a piping system including at least one pipe and an end flange mounted on the pipe for connecting the pipe to another object, a test flange comprising:

a plate engagable over the end flange to be captured between the end flange and said object with at least one portion of the plate extending beyond a peripheral edge of the end flange;

an aperture through the plate for alignment with the pipe;

a test port formed in said at least one portion of the plate for connection to a valve; and a passage in the plate between the aperture and the test port.

2. A system according to claim 1 wherein the test flange includes a normally closed valve connected to the test port.

3. A system according to claim 2 wherein the normally closed valve is a quick disconnect valve.

4. A system according to claim 1 wherein said at least one portion of the plate comprises a lug projecting from the plate.

5. A system according to claim 1 wherein the plate is elongate and includes fastener openings on opposite sides of the aperture.

6. A system according to claim 1 including seal means on one side of the plate, surrounding the aperture.

7. A system according to claim 6 wherein the test port is formed in a side of the plate opposite said one side.

8. A system according to claim 7 wherein said at least one portion of the plate comprises a lug projecting from the plate.

9. A system according to claim 8 wherein the plate is elongate and includes fastener openings on opposite sides of the aperture.

10. A system according to claim 9 including a normally closed valve connected to the test port.

11. A system according to claim 10 wherein the normally closed valve is a quick disconnect valve.

* * * * *